United States Patent Office.

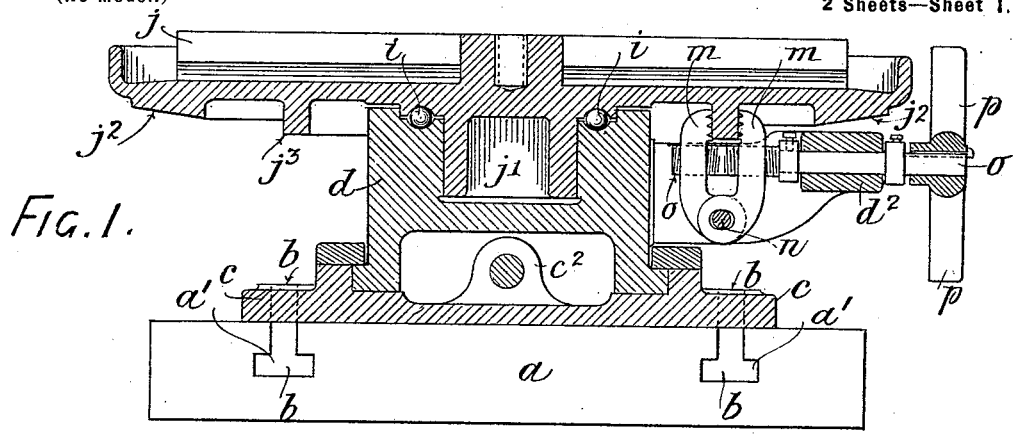

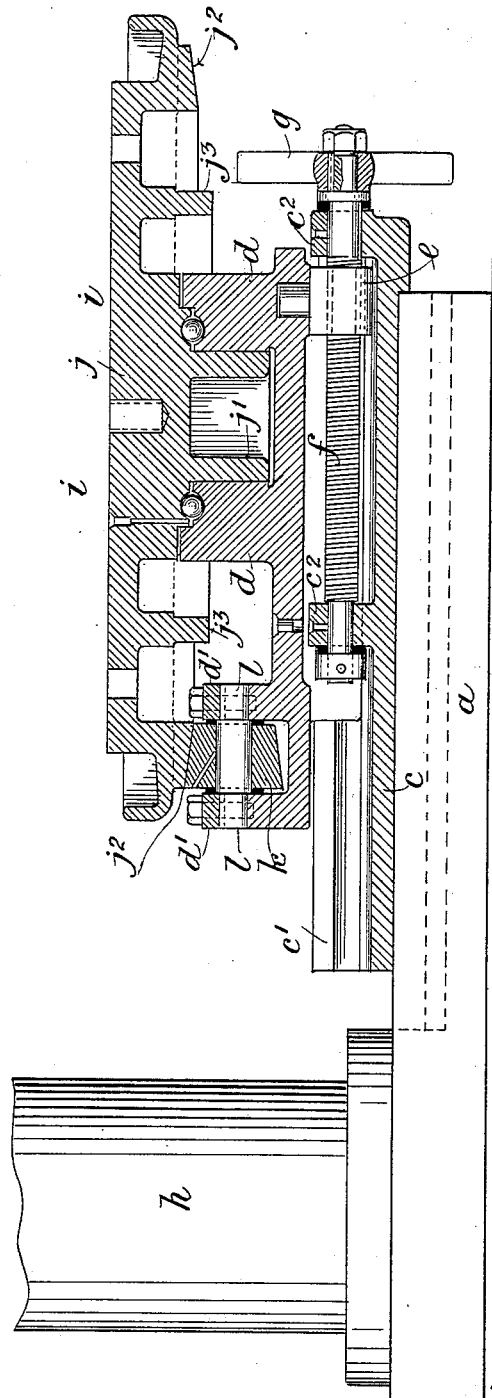

THOMAS CARTER BEELEY, OF HYDE, ENGLAND.

VERTICAL DRILLING-MACHINE.

SPECIFICATION forming part of Letters Patent No. 638,695, dated December 12, 1899.

Application filed July 11, 1899. Serial No. 723,479. (No model.)

*To all whom it may concern:*

Be it known that I, THOMAS CARTER BEELEY, engineer, a subject of the Queen of Great Britain, residing at Hyde Junction Iron Works, Hyde, in the county of Chester, England, am in possession of an invention for Improvements in Vertical Drilling-Machines, of which the following is a specification.

My improvements are applicable to vertical drilling-machines in which the work to be drilled is placed and secured when necessary upon the base or bed plate of the machine and the size of the work which can be placed on the machine is limited by the distance between the center of the drill-spindle and the pillar of the machine; and the chief objects of my improvements are to enable larger pieces of work to be drilled upon the machine, also to provide means for taking the thrust of the drill and preventing the work-table springing, and for locking the said table when the work is in position for being drilled.

In the accompanying two sheets of drawings, Figure 1 is a cross-section; Fig. 2, a plan with the work-table removed, and Fig. 3 a longitudinal section of part of a vertical drilling-machine constructed with my improvements.

In the views, $a$ designates the base-plate of the machine, $a'$ the usual T-head slots therein, and $b$ the correspondingly-shaped bolts fitted in the slots and securing the table $c$ to the base-plate $a$. In a slideway $c'$ on the table $c$ is fitted an intermediate piece $d$, to which is secured a nut $e$, and through this nut passes a screw $f$, carried near each end in bearings $c^2$ on the table $c$. On the screw $f$ is fixed a cross or handle $g$, by turning which the intermediate piece $d$ can be moved to or from the pillar $h$, which carries the usual vertical drilling appliances. (Not shown.) The upper portion of the intermediate piece $d$ is recessed and prepared with an annular groove to receive a number of antifriction-balls $i$, and on these balls rests a table $j$, preferably a round table, for carrying the work to be drilled. The work-table $j$ has a hollow stem $j'$ on its under side, which fits into a corresponding socket in the intermediate piece $d$.

In order to take the thrust of the drill, an antifriction-roller $k$, preferably tapered, is mounted on a stud $l$, carried in bearings $d'$ on the intermediate piece $d$, and the lower edge of the round table $j$ is turned at $j^2$ to a taper corresponding to the surface of the roller $k$, which serves to take the thrust of the drill and to prevent the round table $j$ from springing.

To lock the round table $j$ when the work is in its position for being drilled, any suitable device may be employed—as for example an annular flange $j^3$ is cast upon the under side of the table $j$, and a pair of gripping-jaws $m$ are mounted on a stud $n$, carried by the intermediate piece $d$, and a screw $o$ with right and left hand thread which has a bearing $d^2$ in the intermediate piece $d$, passes through the jaws $m$ and has a cross or handle $p$ at its outer end, which the operator can move with his foot to cause the jaws $m$ to grip the flange $j^3$ and lock the table $j$ or to release it, as required.

Having now particularly described and ascertained the nature of my said invention and in what manner the same is to be performed, what I claim, and desire to secure by Letters Patent of the United States, is—

The combination with the base-plate $a$, and pillar $h$, of a vertical drilling-machine, of the piece $d$ movably carried upon said base-plate, means for adjusting it toward and from said pillar, the work-table $j$ rotatably mounted upon said piece $d$, the roller journaled in an extension of said piece $d$, the annular track or flange $j^2$ on the under side of said table bearing on said roller, a second annular flange on the under side of said table and gripping-jaws also carried by an extension of said piece $d$ and adapted to grip said flange $j^3$ and means for operating said jaws, substantially as described.

In witness whereof I have hereunto set my hand in presence of two witnesses.

THOMAS CARTER BEELEY.

Witnesses:
 H. B. BARLOW,
 HERBERT R. ABBEY.